United States Patent
DiMaria et al.

[11] Patent Number: 6,075,455
[45] Date of Patent: *Jun. 13, 2000

[54] BIOMETRIC TIME AND ATTENDANCE SYSTEM WITH EPIDERMAL TOPOGRAPHICAL UPDATING CAPABILITY

[75] Inventors: Peter C. DiMaria, Somers; James Madsen, Enfield, both of Conn.

[73] Assignee: Accu-Time Systems, Inc., Ellington, Conn.

[*] Notice: This patent is subject to a terminal disclaimer.

[21] Appl. No.: 09/374,734

[22] Filed: Aug. 13, 1999

Related U.S. Application Data

[63] Continuation of application No. 08/936,031, Sep. 23, 1997, Pat. No. 5,959,541.

[51] Int. Cl.[7] .................................................. G07D 7/00
[52] U.S. Cl. .......................... 340/825.34; 340/825.3; 340/825.31; 382/115; 382/124; 382/125; 382/126; 382/127
[58] Field of Search ................... 340/825.34, 825.31, 340/825.3; 382/115, 124, 125, 126, 127

[56] References Cited

U.S. PATENT DOCUMENTS

| | | | |
|---|---|---|---|
| 3,581,282 | 5/1971 | Altman | 340/149 |
| 4,006,459 | 2/1977 | Baker et al. | 340/149 |
| 4,151,512 | 4/1979 | Riganati et al. | 340/146.3 |
| 4,210,899 | 7/1980 | Swonger et al. | 340/146.3 |
| 4,525,859 | 7/1985 | Bowles et al. | 382/5 |
| 4,805,223 | 2/1989 | Denyer | 382/4 |
| 4,995,086 | 2/1991 | Lilley et al. | 382/4 |
| 5,195,145 | 3/1993 | Backus et al. | 382/4 |
| 5,335,288 | 8/1994 | Faulkner | 382/4 |
| 5,337,043 | 8/1994 | Gokcebay | 340/825.31 |
| 5,483,601 | 1/1996 | Faulkner | 382/115 |
| 5,509,083 | 4/1996 | Abtahi et al. | 382/124 |
| 5,552,766 | 9/1996 | Lee et al. | 340/541 |
| 5,559,504 | 9/1996 | Itsumi et al. | 340/825.3 |
| 5,594,806 | 1/1997 | Colbert | 382/115 |
| 5,812,252 | 9/1998 | Bowker et al. | 356/71 |
| 5,959,541 | 9/1999 | DiMaria et al. | 340/825.34 |

OTHER PUBLICATIONS

"Zugang flexibel kontrollieren," Elektronik, Nov. 5, 1982, vol. 31, No. 22, p. 26.

*Primary Examiner*—Brian Zimmerman
*Assistant Examiner*—Yves Dalencourt
*Attorney, Agent, or Firm*—Volpe and Koenig, P.C.

[57] ABSTRACT

A biometric time and attendance device for scanning an epidermal portion of a human body, generating an epidermal topographical pattern and transmitting the epidermal topographical pattern to a host computer for determining access privileges and for updating epidermal topographical database.

18 Claims, 6 Drawing Sheets

BIOMETRIC TIME AND ATTENDANCE SYSTEM WITH EPIDERMAL TOPOGRAPHICAL UPDATING CAPABILITY

CROSS-REFERENCES TO RELATED APPLICATIONS

This patent is a continuation application of U.S. patent application Ser. No. 08/936,031, filed on Sep. 23, 1997 which is now a U.S. Pat. No. 5,959,541.

BACKGROUND OF THE INVENTION

1. Field of the Invention

The present invention relates to time and attendance devices. More particularly, the present invention relates to a biometric time and attendance device for scanning a portion of a human epidermis, generating an epidermal topographical pattern and transmitting the epidermal topographical pattern to a host computer for determining access privileges and for updating an epidermal topographical database.

2. Description of the Prior Art

Increasingly, security problems are becoming a more noticeable part of modern life. Security was once primarily the preserve of classified government installations, but increasing losses and calamity have forced the review of security equipment and procedures for government and industry. Property losses and the theft of corporate secrets cost industry billions of dollars annually. Public safety is endangered by the ability of intruders to easily enter secured places, such as aircraft and airport buildings, without detection.

Accordingly, access control and personnel identification are becoming the object of significant expenditures by organizations seeking to identify employees, vendors and others who are to be permitted access to secured areas.

Typical access control applications include: computer centers; radioactive or biological danger areas; controlled experiments; information storage areas; airport maintenance and freight areas; drug storage areas; apartment houses and office buildings; safe deposit boxes and vaults; and computer terminal entry.

Ascertaining the identity of an individual is a common problem for any access control application. There are three typically accepted ways of establishing a person's identity: (1) a personal identification code; (2) an encoded card having identification information; or (3) examination of a physical characteristic, such as a fingerprint. Since fingerprints and other epidermal topography are unique to an individual, they provide an extremely reliable identification characteristic. Fingerprint identification has been used for many years to help solve crimes, provide positive identification for security and help to identify missing persons. In addition, physical characteristics are practical for identification use because individuals do not ordinarily object to being so identified.

Devices are available to electronically scan epidermal characteristics and to produce related data signals which can be matched to stored images in a real time identification process. For example, U.S. Pat. No. 4,210,899 discloses a fingerprint-based access control and identification apparatus which reads a human fingerprint and transmits the electronic representation of the fingerprint to a centralized image processing unit. The processing unit determines whether the individual whose fingerprint has been read is permitted access to certain areas at the specific time the fingerprint is read.

U.S. Pat. No. 5,559,504 shows a device for performing fingerprint identification and continuous updating of the stored information. Each time a match is made, the device removes the prior data and stores the latest fingerprint pattern. The next fingerprint identification is performed by using the latest registered identification pattern. Identification information or an identification code is not required to update the fingerprint pattern stored in memory.

U.S. Pat. No. 5,337,043 discloses an access control system which uses cards for storing data in the form of a barcode. The comparison of an individual's fingerprint with a fingerprint representation stored in a barcode is made directly at the access control point. The access control point decision to admit or deny access and a keyholder identifying code are sent in a report to a host computer. The time of day and the access control point location can be added to the report by the host computer. The system minimizes the contact of the intelligent terminal with the host computer rather than using a dumb terminal transmitting read data for processing by a host computer.

Although current systems provide rudimentary access control functions, there continues to be a need for an inexpensive method of controlling access to specified areas, accounting for changes in the epidermal topography in the data base, and providing a record of time and attendance of employees.

SUMMARY OF THE INVENTION

The present invention provides an epidermal topography based access control system which reads a portion of the human epidermis (e.g. a fingerprint). The system may include a plurality of terminals connected to a remote database storing epidermal topographical patterns and authorized access information. Each terminal scans a predetermined epidermis and generates an epidermal topographical pattern which is transmitted to a host computing device. The host computing device compares the transmitted epidermal topographical pattern with the stored epidermal topographical patterns. If a match is found, the host computer reads the information associated with the stored epidermal topographical pattern and determines whether access or egress at the current time is permissible. If no match is found, the terminal requests an authorization code. If an authorization code is entered and followed by a personal identification code, the individual seeking access may input a new epidermal topographical pattern to update the remote database.

For added security, each terminal may be equipped with a card reader or keypad for reading or entering additional identification information associated with the epidermal pattern data.

DESCRIPTION OF THE PREFERRED EMBODIMENTS

The preferred embodiments are described with reference to drawing figures wherein like numerals represent like elements throughout.

Figure 1:
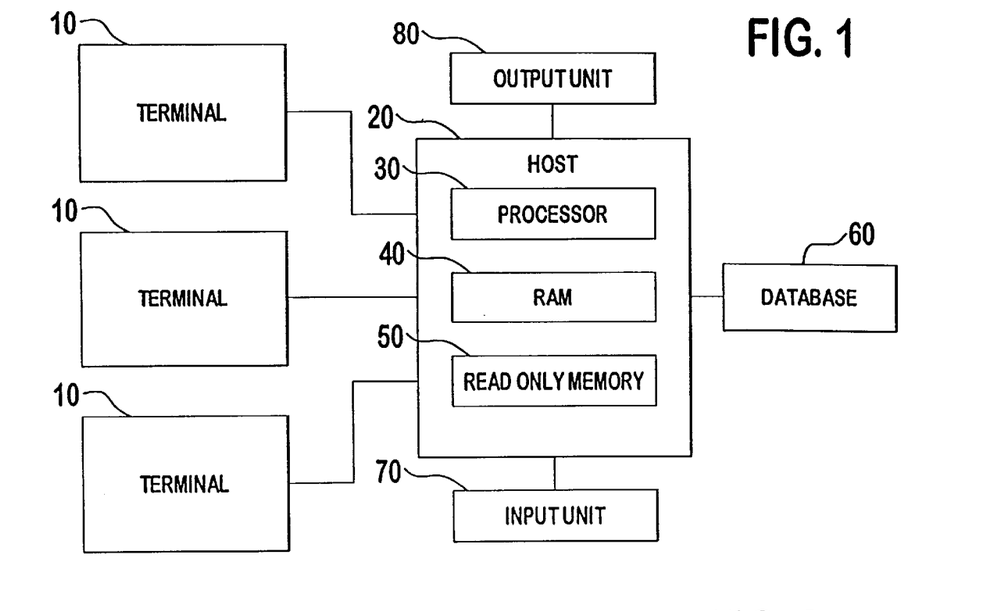
FIG. 1 is a block diagram of an embodiment of the present invention having multiple terminals.

FIG. 1 shows a possible configuration of a multiple terminal biometric time and attendance system with epidermal topography updating capability. A plurality of terminals 10 are connected to a host 20 which includes a processor 30, a RAM 40 and a ROM 50. The host 20 can be programmed to permit entry and/or egress (collectively referred to as access) for certain personnel based upon epidermal topographical patterns and access information. Access information includes a list of access control areas and times during which an individual is permitted to access an area. For example, an individual may be permitted access to controlled area "x" during the second shift. As such, the access information would include the permitted area(s) and the permitted time(s) for that individual. Since the access information is under the employer's control, the permitted area(s) and time(s) of access can be changed easily without the need for the issuance of a new identification card to the individual or getting updated access information to security personnel for manual verification. The host 20 has a data base 60 for storing the individual's epidermal topographical patterns and access information. The host 20 is connected to an input unit 70, such as a keyboard, and an output unit 80, such as a liquid crystal display. Each terminal 10 is placed at a location where access control is desired. This system enables access management for different personnel at different locations and times of day, or different days of the week or calendar days, etc.

Figure 2:
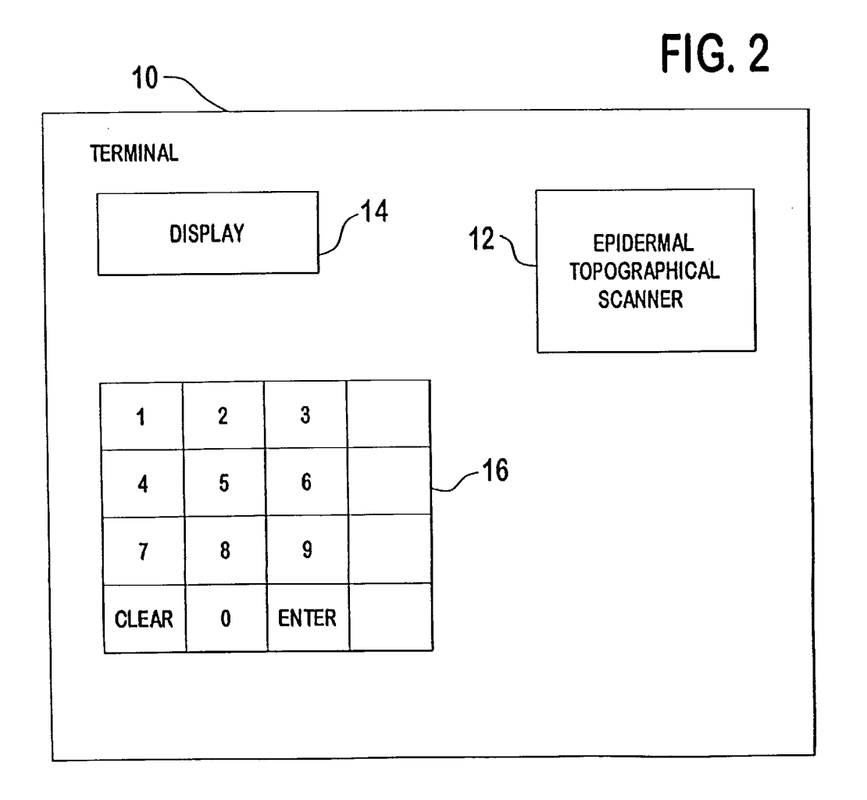
FIG. 2 is a diagram of a first embodiment of a terminal of the present invention.

FIG. 2 is a diagram of a first embodiment of a terminal of the present invention. The terminal 10 includes an epidermal topographical scanner 12, a display 14 and a keypad 16. An example of an epidermal topographical scanner 12 is a fingerprint scanner. The scanner 12 reads a portion of an individual's epidermis and generates an epidermal topographical pattern which is transmitted to the host 20 for comparison. Display 14 may display a final result for the request to gain access or prompt the individual for more information.

Figure 3A:
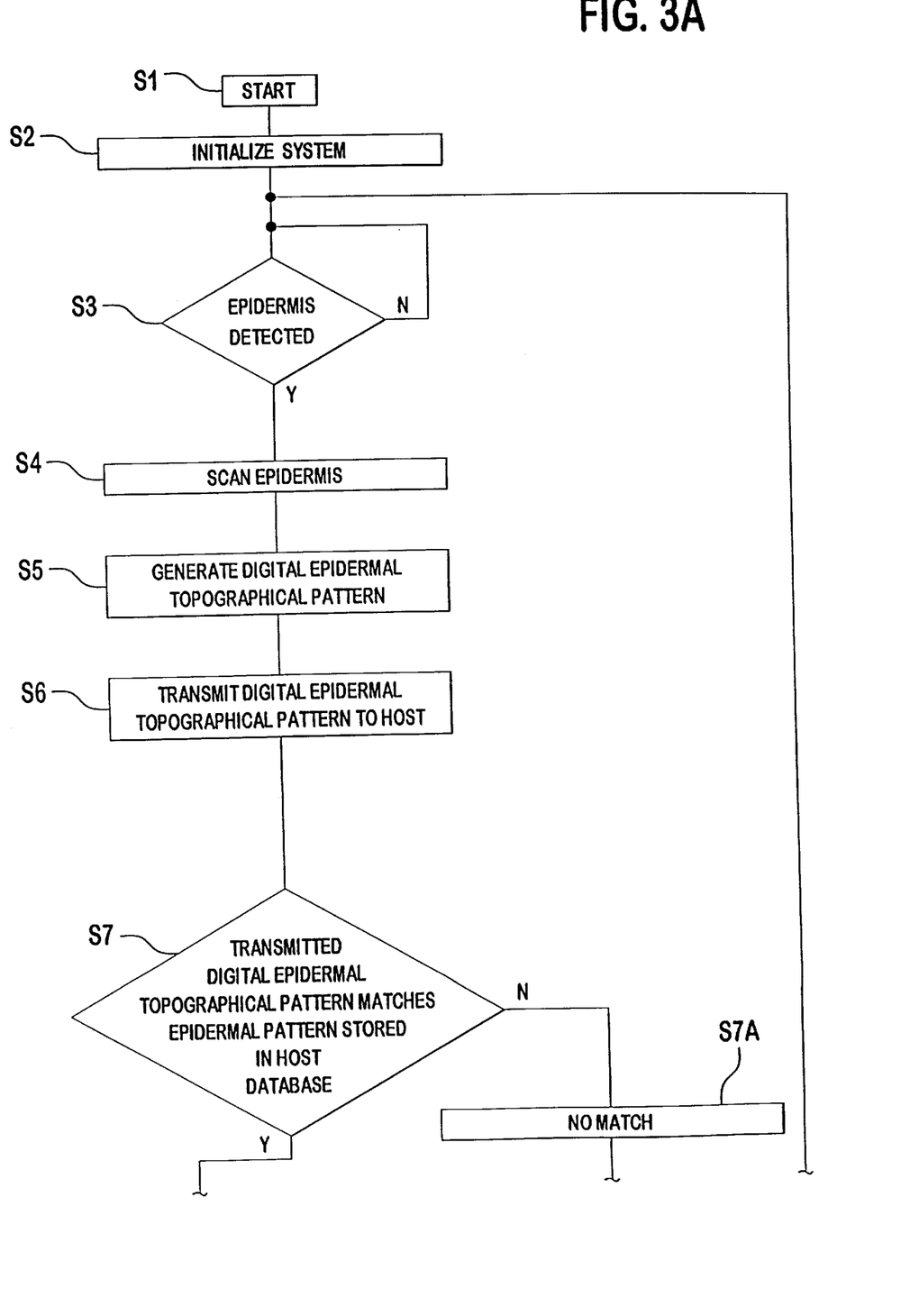
FIGS. 3A and 3B are a diagram of the steps of controlling access utilizing the terminal of the first embodiment of the present invention.
Figure 3B:
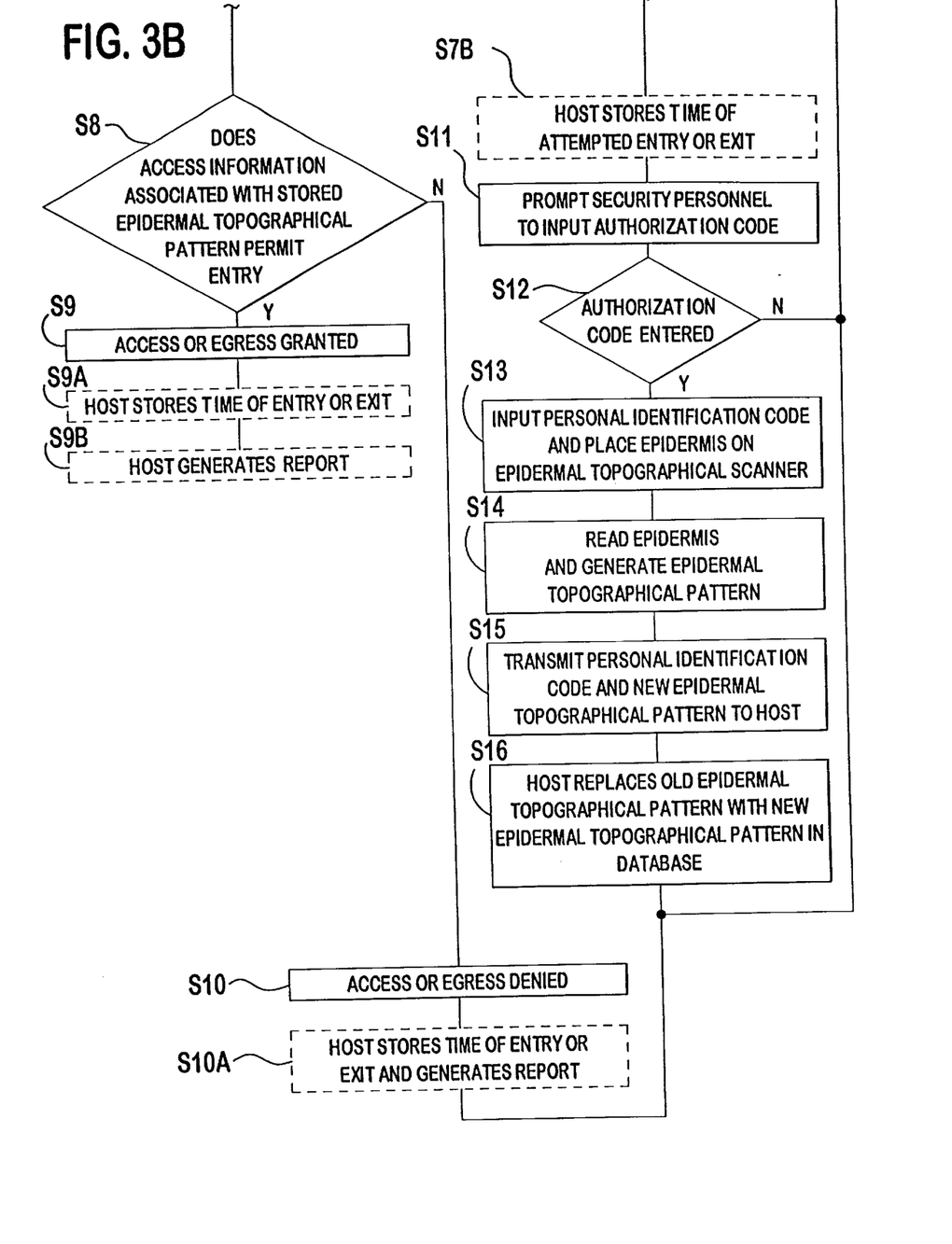

The operational flow of a first embodiment of the terminal 10, which is preferably located outside of the controlled area, is shown in FIGS. 3A and 3B. After the terminal 10 is activated, the program is started (S1) and the system is initialized, preferably automatically (S2). When an epidermis is detected (S3), the epidermal topographical scanner 12 scans the epidermis (S4), generates a digital epidermal topographical pattern signal (S5) and transmits that to the host 20 (S6). The host 20 compares the transmitted pattern with epidermal topographical patterns stored in the database 60 (S7).

If the transmitted epidermal topographical pattern of an individual wishing to gain access does not match one of the stored epidermal topographical patterns, access is denied (S7A), the host computer stores time of the attempt and generates a report (S7B). The display prompts security personnel to make a personal review or investigation of the individual. If it is determined that the individual should gain access, the security personnel proceeds to input an authorization code (S11). After an authorization code is entered and followed by the individual's personal identification code, the individual then places the predetermined epidermis, preferably a finger, on the epidermal topographical scanner 12 (S12 and S13). The epidermis is read and a new epidermal topographical pattern is generated (S14). The new epidermal topographical pattern is transmitted along with the personal identification code to the host 20, which stores the new epidermal topographical pattern with the personal identification code of the individual (S15 and S16). Thus, the database 60 is updated and the system returns to step S3. If an authorization code is not entered, the system returns to step S3.

If the transmitted epidermal topographical pattern matches an epidermal topographical pattern stored in the data base 60 and the access information associated with the stored epidermal topographical pattern permits entry or exit, access is granted (S7, S8 and S9) and then the system returns to step S3. If there is a match and the access information stored with the epidermal topographical pattern does not permit entry or exit, access is denied (S8 and S10) and the system returns to step (S3). Each time an individual is denied (S10), the host 20 preferably stores the time of the attempt and generates a report (S10A).

If desired, the host 20 may store the date and time an individual gains admission to or exit from a controlled area (S9A). A report is then created which indicates the date, time and identity of the individual (S9B). When the same individual exits the controlled area, for example, at the end of a shift or for a meal break, the individual exits the controlled area by placing the same predetermined epidermis on the epidermal topographical scanner 12. An individual can exit a controlled area by placing the predetermined epidermis on an epidermal topographical scanner 12 of another terminal 10, for example, one located inside the controlled area, that is in communication with host 20. Normally, the scanned epidermal topographical pattern will match the stored epidermal topographical pattern (S7) and the host 20 would note and store the time of the event (S9A). The generated report (S9B) should reflect the date, time and location the individual exited-the controlled area. In the event the individual damaged the stored epidermis pattern while in the controlled area, the host 20 stores the time and date of attempted exit (S7B) and generates a report. An authorization code (S11) may be input by security personnel to permit the individual's departure from the controlled area. The authorization code also permits the individual to submit a new epidermal topographical pattern to update the database (S13–S16). The host 20 preferably uses the above dates, times and locations of entry and exit, over a period of time, such as a week, to generate management and payroll reports.

Figure 4:
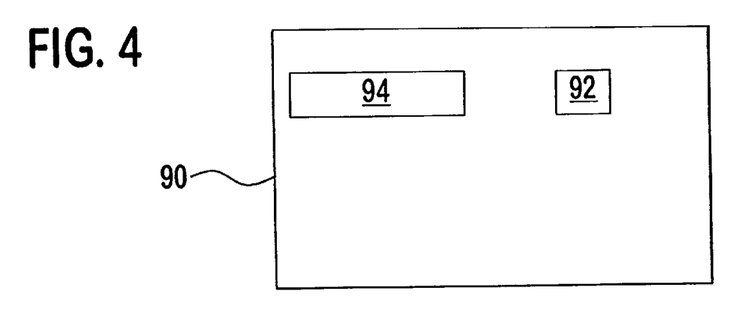
FIG. 4 is a block diagram of a front face of a card.
Figure 5:
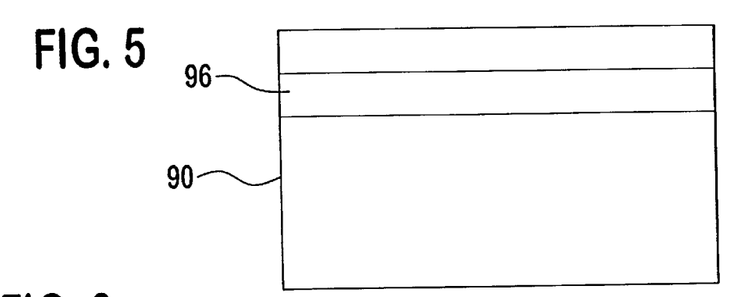
FIG. 5 is a block diagram of a rear face of a card.

FIGS. 4 and 5 show an example of a card 90, which is read by a terminal 100 in a second embodiment of the present invention. In order to access a controlled area, an individual is required to present a card 90 having at least one machine readable medium. FIG. 4 shows the front face of a card 90 having a photograph 92 and a visible machine readable code 94. The card 90 may also contain personal identification information such as the bearer's name, eye color, etc. The same personal identification information may be encoded in the visible machine readable code 94. FIG. 5 shows the rear face of the card 90 which includes magnetic stripe 96. Personal identification information from the front face of the card 90 is also preferably encoded on the magnetic stripe 96. Non-visible information may also be encoded on the magnetic stripe 96.

Figure 6:
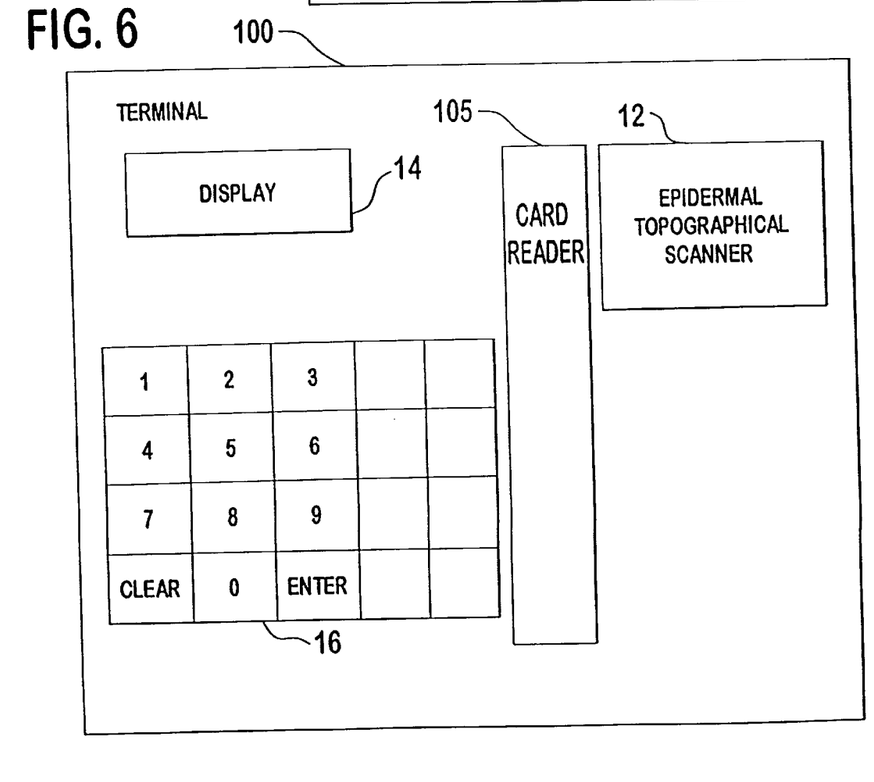
FIG. 6 is a diagram of a second embodiment of a terminal of the present invention.

Referring to FIG. 6, a block diagram of a second embodiment of the present invention is shown. A terminal 100 is substituted for the terminal 10 in FIG. 1. In addition to the epidermal topographical scanner 12, display 14 and keypad 16, the terminal 100 includes a card reader 105 for reading either visible machine readable code 94 or encoded data on the magnetic stripe 96. The reader 105 may also be configured to read both 94 and 96. The scanner 12 reads a portion of an individual's epidermis, preferably a fingerprint, and generates an epidermal topographical pattern.

Figure 7A:
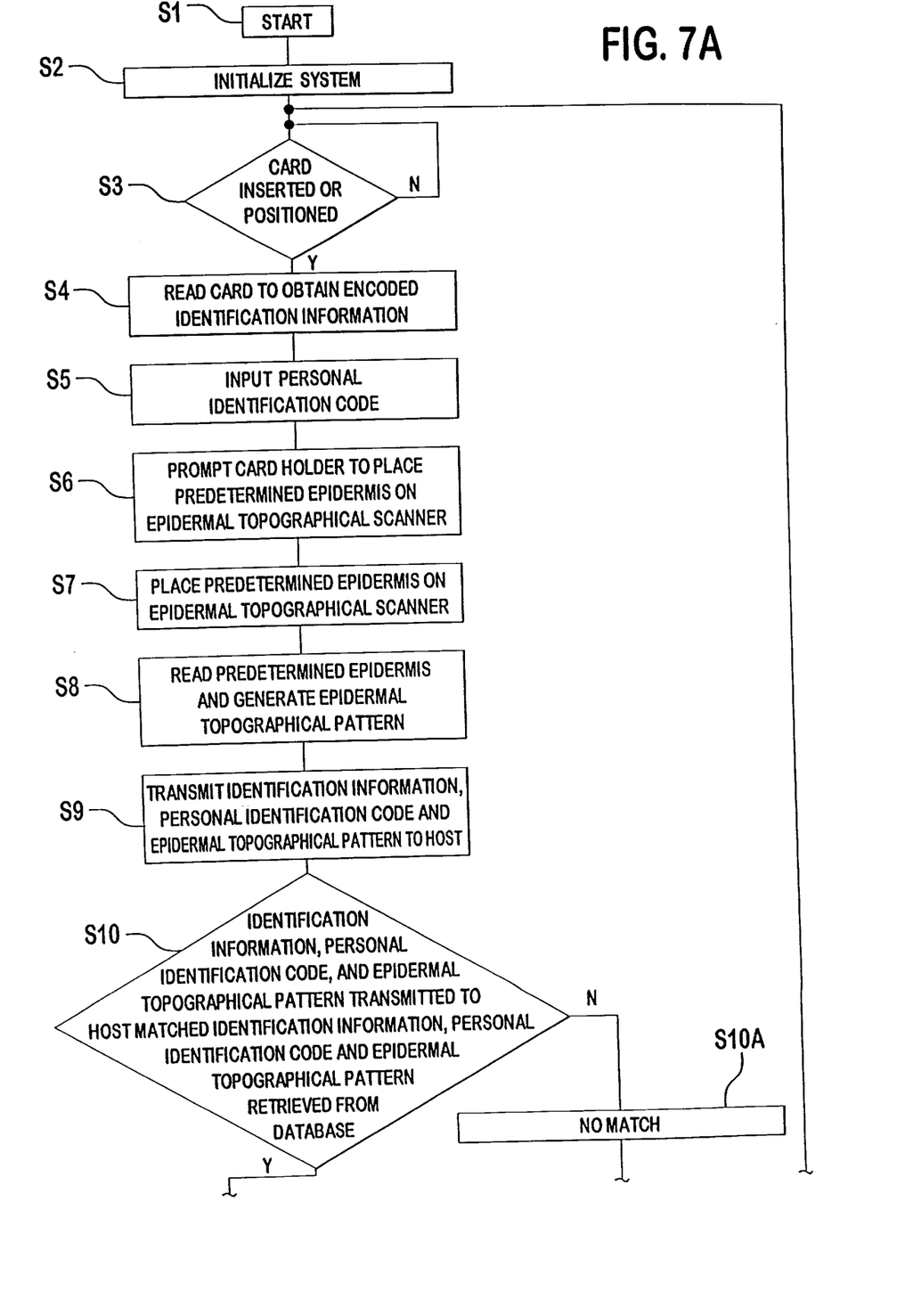
FIGS. 7A and 7B are a diagram of the steps of controlling access utilizing the second embodiment of the terminal of the present invention.
Figure 7B:
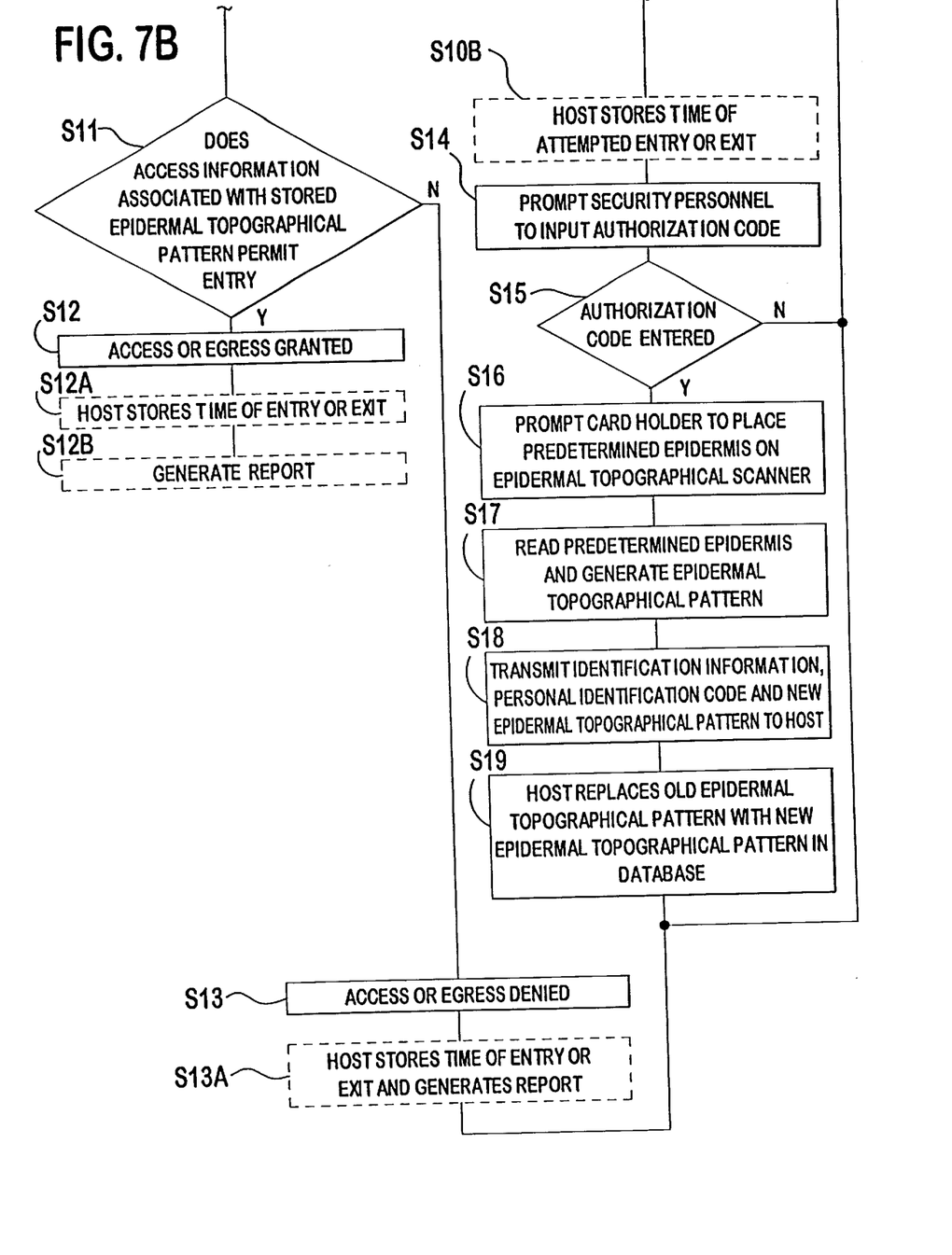

Operation of the alternative embodiment of the present invention is shown in the flow charts of FIGS. 7A and 7B. After the terminal 100 is activated, the program is started (S1) and the system is initialized, preferably automatically (S2). The card 90 is inserted into, or scanned by, card reader 105 (S3). The card 90 is read to obtain the identification information encoded thereon (S4). For added security, the individual may be prompted to input a personal identification code (S5). The display prompts the person seeking access to place a predetermined epidermis, such as a finger, on the epidermal topographical scanner 12 (S6). The epidermis is placed on the scanner (S7), the epidermis is scanned and an epidermal topographical pattern is generated (S8). The identification information, along with the identification code, and epidermal topographical pattern are transmitted to the host 20 (S9). The host 20 compares the transmitted information with the information in the database (S10).

If the transmitted information of the individual seeking access does not match (S10A), the terminal 100 stores the time of attempted entry or exit. The display 14 prompts security personnel to make a personal review or investigation of the individual. A display 14 requests a security or authorization code (S14). If it is determined that the individual should gain access, the security guard or other authorized person enters a security code or authorization code (S15). If an authorization code is entered and followed by the individual's personal identification code, the individual places the predetermined epidermis on the epidermal topographical scanner 12 (S16), which reads the epidermis and generates an epidermal topographical pattern (S17). This pattern is transmitted along with the personal identification code to the host (S18). The host then replaces the old epidermal topographical pattern with the transmitted epidermal topographical pattern in the data base 60 (S19). The system then returns to step (S3) so that the individual can obtain access to or egress from the controlled area by repeating steps (S3–S10). If an authorization code is not entered, the system returns to step S3.

If the associated access information does not permit access at the current date and time (S11), access is denied (S13) and the system returns to step (S3). Each time access is denied (S13), the host 20 preferably stores the time of the attempt and generates a report (S13A). Then, the system returns to step (S3).

If the transmitted information matches and the associated access information indicates that access is permitted (S11), access is granted (S12) and the system returns to step S3. If desired, host 20 may store the date and time an individual gains admission to or exits from a controlled area (S12A). A report is then created which indicates the date, time of entry and identity of the individual (S12B). When the same individual exits the controlled area, for example, at the end of a shift or for a meal break, the individual must place the predetermined epidermis on the epidermal topographical scanner 12. Alternatively, the individual can place the predetermined epidermis on another epidermal topographical scanner 12 inside the controlled area. If the scanned epidermal topographical pattern matches the stored epidermal topographical pattern (S10), the host 20 would note and store the time of exit (S12A). The generated report (S12B) should reflect the date, time and location of the individual's exit from the controlled area. In the event the individual damaged the recorded epidermis while in the controlled area, the epidermis will not match the recorded epidermis (S10A). The host 20 preferably stores this event (S10B). However, an authorization code (S14 and S15) may be input by security personnel to permit the individual to exit and record that departure from the controlled area. The authorization code also permits the individual to submit a new epidermal topographical pattern to update the database (S16–S19). Over a period of time such as a week, the host 20 uses this information to generate management and payroll reports.

I claim:

1. An apparatus for controlling personnel movement in a controlled area, the apparatus comprising:

a host computing device;

means operatively associated with the host for receiving and storing at least an individual record that is associated with an individual's predetermined epidermal topographical pattern and personal identification data;

at least one data collection terminal, in communication with the host, that terminal includes an epidermal topographical scanner for inputting an individual's epidermal topographical pattern in a format suitable for comparison with the stored epidermal topographical pattern;

means for granting or denying access based on the result of the comparison; and means for selectively overriding a denied access attempt and granting access while maintaining the stored epidermal topographical pattern.

2. The apparatus of claim 1 wherein said at least one data collection terminal further comprises a card reader for reading identification information in a machine readable format.

3. The apparatus of claim 1 further comprising:

means for prompting an attendant to make a human evaluation of the presenter in response to a denied access attempt.

4. The apparatus of claim 1 further comprising:

means for changing the recorded information for an individual and associating that changed information with the individual's predetermined epidermal topographical pattern.

5. The apparatus of claim 1 wherein the overriding means overrides the denied access attempt upon receipt of an authorization code.

6. The apparatus of claim 5 wherein the overriding means includes a keypad.

7. The apparatus of claim 1 wherein the personal identification data includes a code and said at least one terminal further comprises means for inputting an individual's personal identification code.

8. The apparatus of claim 7 wherein said inputting means includes a keypad.

9. The apparatus of claim 8 further comprising means for replacing the stored epidermal topographical pattern with an inputted epidermal topographical pattern in response to an overridden denied access attempt.

10. An apparatus for controlling personnel movement in a controlled area on the basis of access information that authorizes personnel movement in the area, the apparatus comprising:

a host computing device;

means operatively associated with the host for receiving and storing access information for at least an individual stored record that is associated with an individual's predetermined epidermal topographical pattern and a personal identification code;

at least one data collection terminal in communication with the host, that terminal includes a means for inputting the personal identification code and an individual's epidermal topographical information in a format suitable for comparison with the stored access information to determine if the presented individual is granted or denied access to the area; and means for selectively overriding a denied access attempt to grant access while maintaining the stored epidermal topographical pattern.

11. The apparatus of claim 8 wherein said at least one data collection terminal further comprises a card reader for reading identification information in a machine readable format.

12. The apparatus of claim 10 wherein said overriding means comprises means for inputting a new epidermal topographical pattern in a stored record upon receipt of an authorization code.

13. The apparatus of claim 12 further comprising means for replacing a stored epidermal topographical pattern with the inputted epidermal topographical pattern.

14. The apparatus of claim 12 wherein said inputting means includes a keypad for inputting the authorization code and personal identification code.

15. The apparatus of claim 10 wherein said inputting means includes an epidermal topographical scanner, and means for generating a digital epidermal topographical pattern.

16. A method for controlling personnel movement in a controlled area on the basis of access information that authorizes personnel movement in the area comprising:

providing a host computing device;

providing received and stored access information operatively associated with the host for at least an individual stored record that is associated with an individual's epidermal topographical pattern;

providing an epidermal topographical scanner for scanning a predetermined epidermis of a presented individual;

generating an epidermal topographical pattern based upon the scanning in a format suitable for comparison with the stored epidermal topographical pattern;

determining whether the presented individual should be granted or denied access to the controlled area based on the result of the comparison;

indicating the result of the comparison; and selectively overriding a denied access attempt upon receipt of an authorization code to grant access while maintaining the stored epidermal topographical patterns.

17. The method of claim 16 further comprising:

providing a means for inputting an authorization code to the host;

providing a means for inputting a personal identification code to the host;

providing a means for comparing the personal identification codes to the stored access information; and providing a means for modifying the stored access information based upon the receipt of the authorization code and a favorable comparison of the personal identification code with the stored access information.

18. The method of claim 17 wherein the modifying means replaces the stored epidermal topographical pattern with the generated epidermal topographical pattern.

* * * * *